Sept. 19, 1961

M. J. E. GOLAY 3,000,375

SEMI-CONDUCTOR HEAT ABSORPTION MEANS

Filed Oct. 7, 1957

INVENTOR.
Marcel J.E. Golay
BY
Harry M. Saragovitz
Attorney 3,000,375
Patented Sept. 19, 1961

3,000,375

SEMI-CONDUCTOR HEAT ABSORPTION MEANS

Marcel J. E. Golay, 116 Ridge Road, Rumson, N.J.

Filed Oct. 7, 1957, Ser. No. 688,656
1 Claim. (Cl. 126—270)

The invention described herein may be manufactured and used by or for the Government for governmental purposes without the payment of any royalty thereon.

This invention relates to solar energy apparatus and more particularly to solar heat absorbers and heat radiation filters.

An object of this invention is to provide a surface which reaches an extremely high temperature when exposed to the sun's rays.

A feature of this invention is to provide an efficient heat absorbent material which attains a high temperature without using optical equipment for concentrating the sun's rays onto the object being heated.

A further object is to provide a radiation filter which passes heat radiation while effectively blocking other solar radiation.

It is recognized that black surfaces are good absorbers of heat but they are also strong radiators. In fact, a good radiator is defined as a black body. Thus, it has been universally accepted that while solar absorbers must be black to absorb energy they will therefore lose heat at the maximum rate.

The present invention provides a surface in which solar radiation is absorbed by a semi-conductor black coating and transformed into heat. However, the heat radiated from this coating is negligible. Since this material cannot readily lose heat by radiation the body will reach a temperature higher than that of the ordinary black coatings.

The novel features that I consider characteristic of my invention are set forth with particularity in the appended claim. The invention itself, however, both as to its organization and its method of operation, together with additional objects and advantages thereof, will best be understood from the following description of certain specific embodiments when read in connection with the accompanying drawings in which like reference characters represent like elements and in which:

Figure 1:
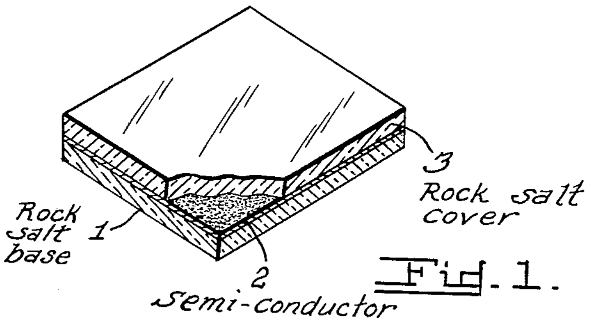
FIG. 1 is a perspective view of the radiation filter.

In FIG. 1 the radiation filter is composed of a base 1 of rocksalt material having a coating of a semi-conductor 2, for example tellurium, evaporated in a vacuum. Other semi-conductors having a sharp absorption edge in the near infrared region can be utilized.

Evaporation in a vacuum in the order of $10^{-4}$ mm. of mercury produces a film having a metallic appearance while evaporation in vacuum of 1 mm. of mercury results in a black film. The films can be protected by a second rocksalt cover plate 3. These filters are totally opaque to the visible portion of the sun's radiation yet transmit most of the heat radiation.

Figure 2:
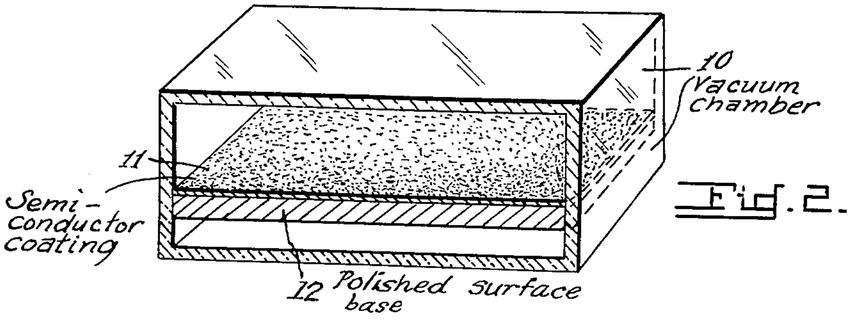
FIG. 2 is a perspective view of the heat absorbent body.

In FIG. 2 a polished metallic plate 12 is coated by evaporation with the semi-conductor black 11 and inclosed in a chamber 10. The chamber is either evacuated or filled with a gas of low thermal conductivity, for example, carbon dioxide, or xenon. The solar radiation is absorbed by this black coating and transformed into heat. The heat radiation from these blacks is extremely small since the emissivity of the coating material, which is equal to the absorptivity is small. The semi-conductor coated surface absorbs a high percent of the sunlight yet the polished metal underneath radiates very little heat it receives from the surface coating. The temperature of the plate so coated and exposed to the sun rises enormously. The absorption being high, coupled with low radiation, no lens system for focusing is required to attain the high temperatures.

Figure 3:
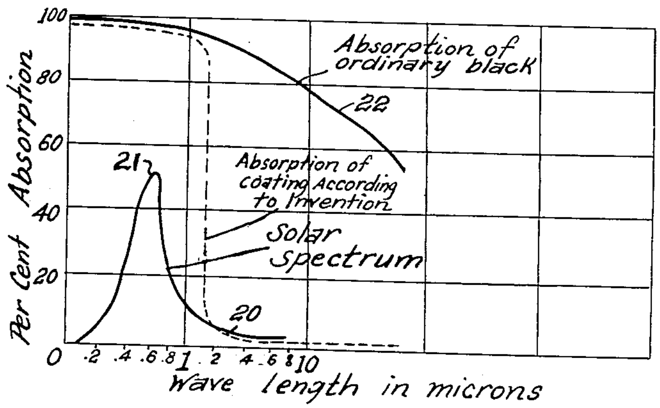
FIG. 3 is a graph of the spectral response illustrating the basic theory.

FIG. 3 further explains the underlying theory by a graph in which the wavelength in microns ($\mu$) is plotted as abscissa with the solar absorption spectrum as ordinate. The solar spectrum of curve 20 shows a peak at 21 in the middle of the visible range around .55$\mu$ (green region of the visible spectrum). The curve 22 shows the absorption of ordinary black paint previously discussed. Dotted curve 23 shows the absorption of the tellurium layer evaporated in a vacuum as disclosed in this invention.

Subjecting the coatings to solar radiation has the following effect. For the bulk of the solar spectrum, at the left side of the graph, absorptions of both layers are high, shown, for example, in the 90% region. Thus, both coatings absorb the same solar energy and reach a high temperature depending upon the material, say 80° C. or 200° C. This temperature corresponds to an emission around 5–15$\mu$. It is noted, however, that the ordinary black (curve 22) has, in this emission range 5–15$\mu$, a high absorption. Since the emissivity of a material is proportioned to its absorptivity, the ordinary black will emit most of the solar heat at around 5–15$\mu$, acting as a frequency converter from 0.4–2$\mu$ to 5–15$\mu$. This results in heat losses by emission. The tellurium black of the invention receives the same heat at .4–2$\mu$ from the sun, but in the emission range 5–15$\mu$, its absorptivity is low. Having low emissivity the heat received is accumulated and therefore the tellurium plate attains a higher temperature than the ordinary black coating.

As an illustration, in a test utilizing two polished copper pipes one was coated with a layer of tellurium evaporated in a partial vacuum, the other was coated with ordinary black enamel. Both were mounted on mica separators and inserted in glass tubing together with thermometers arranged to indicate pipe temperatures. The glass tubing was evacuated and sealed. The pipes were placed in the sun, without any optical means for concentrating the sun's rays. The ordinary black reached a temperature of 85° C. and the tellurium black 128° C. Higher temperatures of the tellurium black could be attained with a higher vacuum. Temperatures in the order of 150° C. to 300° C. are possible.

The invention has numerous applications in many diversified fields, for example, in a light weight inexpensive air conditioning unit or in an apparatus for heating water. Other applications are obvious to one skilled in the art.

While I have exemplified my invention chiefly by reference to a tellurium coating, it should be understood that other semi conductors such as silicon or germanium may be employed without departing from the spirit and scope of the invention.

What is claimed is:

An efficient solar heat collector comprising a closed vacuum chamber transparent to solar radiation, a metallic base plate having a polished reflecting surface spaced from and facing one wall of said chamber and a thin film of tellurium evaporated on said polished reflecting surface in a vacuum of about one millimeter of mercury to produce a black tellurium coating, said black tellurium coating having high absorption in the solar spectral region from 0.4–2 microns, having a sharp cut-off and having low absorptivity and emissivity in the heat energy spectral region from 5–15 microns whereby the coated plate is strongly heated by solar radiation with low heat losses by emissivity in the 5–15 micron spectral region.

References Cited in the file of this patent

UNITED STATES PATENTS

| | | |
|---|---|---|
| 1,946,184 | Abbot | Feb. 6, 1934 |
| 2,420,956 | Kremers et al. | May 20, 1947 |
| 2,512,257 | Pfund | June 20, 1950 |
| 2,917,817 | Tabor | Dec. 22, 1959 |

OTHER REFERENCES

"Interference Filters for the Infrared," Greenler, article in "The Journal of the Optical Society of America," vol. 47, No. 2, February 1957, pages 130 and 131 cited.